United States Patent [19]

Yamaguchi et al.

[11] 4,409,816
[45] Oct. 18, 1983

[54] KNOCK DETECTING APPARATUS FOR AN INTERNAL COMBUSTION ENGINE

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 291,945

[22] Filed: Aug. 11, 1981

[30] Foreign Application Priority Data

Sep. 19, 1980 [JP] Japan ................. 55-130966

[51] Int. Cl.³ ............................................ G01L 23/22
[52] U.S. Cl. ................................. 73/35; 73/654
[58] Field of Search ................. 73/651, 654, 35; 123/425, 435; 336/30

[56] References Cited

U.S. PATENT DOCUMENTS

| | | | |
|---|---|---|---|
| 759,513 | 5/1904 | Frahm | 73/651 X |
| 1,746,171 | 2/1930 | Vatinet et al. | 73/654 X |
| 2,219,803 | 10/1940 | Bourne | 73/651 X |
| 2,275,675 | 3/1942 | Draper et al. | 73/35 |
| 2,300,638 | 11/1942 | Wente | 310/25 |
| 2,302,670 | 11/1942 | Buchanan | 73/514 X |
| 2,319,219 | 5/1943 | Draper et al. | 73/35 |
| 2,417,974 | 3/1947 | Downs et al. | 73/658 |
| 2,424,864 | 7/1947 | Treseder | 73/651 |
| 2,494,109 | 1/1950 | Wolfe | 73/517 R X |
| 2,530,931 | 11/1950 | Alexander | 73/35 X |
| 2,641,719 | 6/1953 | Adams | 73/35 |
| 2,643,869 | 6/1953 | Clark | 73/654 X |
| 2,660,883 | 12/1953 | Wyczalek | 73/35 |
| 2,973,638 | 3/1961 | Fluegel | 73/35 |
| 3,281,743 | 10/1966 | Anderson | 73/654 X |
| 3,395,569 | 8/1968 | Sheridan et al. | 73/35 |
| 3,513,415 | 5/1970 | Dostal | 310/25 |
| 3,540,262 | 11/1970 | Wostl et al. | 73/35 |
| 3,942,359 | 3/1976 | Arrigoni et al. | 73/35 |
| 4,012,942 | 3/1977 | Harned | 73/5 |
| 4,061,116 | 12/1977 | Saida et al. | 123/425 |
| 4,096,735 | 6/1978 | Huntzinger et al. | 73/35 |
| 4,108,006 | 8/1978 | Walter | 73/654 X |
| 4,111,035 | 9/1978 | West et al. | 73/35 |
| 4,163,385 | 8/1979 | Kato et al. | 73/35 |
| 4,233,836 | 11/1980 | Yoneda et al. | 73/35 |
| 4,254,354 | 3/1981 | Keem | 73/35 |
| 4,265,206 | 5/1981 | Garcea | 73/35 |
| 4,275,586 | 6/1981 | Gast et al. | 73/35 |

FOREIGN PATENT DOCUMENTS

| | | | |
|---|---|---|---|
| 445470 | 6/1927 | Fed. Rep. of Germany | 73/651 |
| 1476322 | 6/1964 | Fed. Rep. of Germany | 123/425 |
| 2731069 | 1/1979 | Fed. Rep. of Germany | 73/35 |
| 973510 | 9/1950 | France | 73/651 |
| 55-144520 | 11/1980 | Japan | 73/35 |
| 847511 | 9/1960 | United Kingdom | 73/35 |
| 1185499 | 3/1970 | United Kingdom | 73/35 |
| 1317152 | 5/1973 | United Kingdom | 73/651 |

*Primary Examiner*—James J. Gill
*Attorney, Agent, or Firm*—Cushman, Darby & Cushman

[57] ABSTRACT

An engine knock detecting apparatus having a vibration member with a plate-shaped vibratory portion having a resonance frequency in the frequency range of knocking of the engine. In order to adjust and optimize the degree of peak of the resonance, at least a part of the vibratory portion of the vibration member has a multi-layered structure consisting of two or more layers.

11 Claims, 14 Drawing Figures

KNOCK DETECTING APPARATUS FOR AN INTERNAL COMBUSTION ENGINE

BACKGROUND OF THE INVENTION

The present invention relates to an engine knock detecting apparatus for use in an ignition timing controller of internal combustion engine or a like device, which controller adjusts the ignition timing, of the engine so that a predetermined degree of knocking occurs. More specifically, the present invention relates to a knock detector which detects engine knock by sensing vibrations outside the cylinder due to internal pressures therein.

It is well known that there is a close relationship between ignition timing and the internal pressure of a cylinder. In the ordinary state of combustion without any knock, no higher harmonic appears in the internal pressure of the cylinder. The term "higher harmonics" is used here to mean vibration components having frequencies generally ranging between 5 KHz and 10 KHz and between 11 KHz and 13 KHz, the frequency being determined by the bore diameter of the cylinder and the sonic velocity. This higher harmonic is caused by a detonation in the combustion.

As knocking takes place, these higher harmonics begin to appear as the internal pressure of the cylinder is increased to the level near the maximum pressure. These higher harmonics are observed at the outside of the cylinder as an abnormal vibration or noise. A full analysis of the signal representing the internal pressure or the vibration or noise observed at the outside of the cylinder reveals the following. The initial symptom of knocking (trace knocking) is observed at an engine crank angle corresponding to the maximum pressure in the cylinder. As the degree of knocking advances to the state of light knock and then to the state of heavy knock, the crank angle at which the higher harmonics are generated is shifted to the advanced side, i.e. toward the ignition angle, from the crank angle at which the maximum pressure is observed.

It is, therefore, possible to remarkably increase the efficiency of the engine by a suitable feedback control of the ignition timing upon minute sensing of the vibration and noise appearing at the outside of the cylinder.

At the present stage, however, there is no apparatus which can accurately detect the state of knock as the factor to be fed back and operate stably under the severe operating conditions which the vehicle must undergo.

Two types of detecting apparatuses for this purpose are known: a commercially available detecting apparatus making use of a piezoelectric accelerometer and a resonance type apparatus which is now under discussion and development by the present inventors.

The piezoelectric accelerometer type apparatus has a resonance point which is usually at a frequency range above the frequency range at which engine knock takes place, and exhibits a substantially flat detection characteristic for the frequencies below the knock frequency. This type of apparatus, therefore, will be referred to as "non-resonance type" hereinunder. In contrast, the resonance type detecting apparatus has a resonance point at the frequency level of the knock, so that it has a high sensitivity in the frequency region around the resonance point as compared with other frequencies. However, due to a pecularity in the resonance, the range of detectable frequencies is reduced as the peak Q of the resonance becomes higher.

The sensor of the non-resonance type suffers an inferior S/N ratio due to the vibration noise of the engine, so that it cannot be practically used in detecting knocking at high engine speed, although it theoretically provides a wide range of detectable frequencies. To the contrary, the resonance type apparatus has much superior detection performance due to a high S/N ratio and high sensitivity, but the Q value is so high that the range of sensitivity is impractically small. In consequence, the resonance type detecting apparatus may fail to detect knocking when the resonance point is shifted or when the knocking frequency is changed due to a change in the state of combustion. This feature is quite disadvantageous because, while knock takes place over a wide range of frequencies, the detection apparatus cannot provide uniform detection characteristics over the entire frequency range and, therefore, can detect frequencies of only a narrow range. In spite of this fact, the resonance type detecting apparatus still has much superior detection characteristics as compared with the non-resonance type. For attaining a higher detection accuracy, therefore, it is desirable to obtain a trapezoidal detection characteristic curve having wide range of detectable frequencies at a cost of a lowered Q value.

Generally, there is a close relationship between the Q value and the attenuation characteristic in response to an impulse. More specifically, the attenuation time increases as the Q value increases, while the attenuation time is shortened as the Q value becomes smaller. Usually, the judgment as to whether knocking is taking place or not is made through the comparison of the output from the detecting apparatus obtained when knocking is taking place in the engine with the integrated value of the output from detecting apparatus as obtained when knocking is not taking place, i.e. with the output corresponding to the vibration noise of the engine. Therefore, if the attenuation time is long due to the high Q value, the noise component becomes great to deteriorate the S/N ratio. In other words, it is desirable that the output from the detecting apparatus is attenuated without delay after knocking. The reduction of Q value is preferred also from this point of view.

SUMMARY OF THE INVENTION

Accordingly, an object of the invention is to provide an engine knock detecting apparatus in which the S/N ratio of detection is highly improved by a reduction in the peak degree Q of resonance to a suitable level.

According to one aspect of the invention, the vibratory part of a vibration member has a laminated or multi-layered structure composed of two or more layers so that, during vibration, the layers interfere with one another to suppress vibrations so that the peak degree Q is lower than that obtained with a vibration member having a single-layered structure.

The multi-layered structure can have a plurality of leaves or plates overlapped in such a manner that these plates make contact with adjacent ones over their entire surfaces thereof and locally jointed to adjacent ones at suitable positions.

Alternatively, adjacent plates are jointed to adjacent ones in such a manner that a sealed space is formed between adjacent plates and the sealed space is filled with a suitable damping material such as oil, resin, powder and so forth.

DESCRIPTION OF THE PREFERRED EMBODIMENTS

Figure 1:
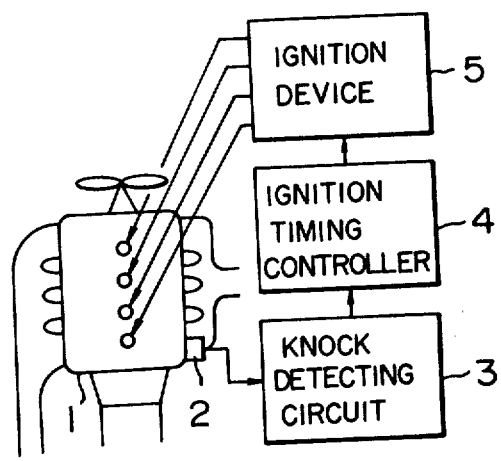
FIG. 1 is a block diagram of a knock feedback ignition control system incorporating a knock detecting apparatus in accordance with an embodiment of the invention.

FIG. 1 shows a knock feedback ignition system incorporating a knock detecting apparatus of the invention. This ignition system includes a knock detecting apparatus 2 mounted by means of screws or the like means on the cylinder block of an internal combustion engine 1 having four tandem cylinders, a knock detecting circuit 3 adapted to detect the knocking from the output of the knock detecting apparatus, an ignition timing controller 4 adapted to advance or delay the ignition timing to optimize the latter, and an ignition device 5 adapted to deliver an output to each ignition plug of the engine 1 upon receipt of the output from the ignition timing controller 4.

The knock detecting circuit 3 of this ingition system makes, upon receipt of an ignition signal derived from an ignition signal detector (not shown), a sampling of the noise component of the vibration of the engine at a predetermined timing or crank angular position where no knock takes place, making use of the output from the knock detecting apparatus 2. The knock detecting circuit also detects the output from the knock detecting apparatus at a timing or crank angular position which is delayed by a predetermined time length or crank angle behind the Top Dead Center at which the peak of indicated pressure takes place, i.e. at a timing or crank angular position at which the knock tends to occur. The knock detecting circuit 3 then discriminates whether the knock is actually taking place or not from the ratio between the sampled noise component and the output of the knock detecting apparatus obtained at the predetermined timing after the Top Dead center. In some cases, integrated values, i.e. mean values are used in this discrimination. Alternatively, the occurrence of the knock is detected not through the processing of independent signals but in terms of probability. For instance, the occurrence of engine knock is discriminated from the percentage of the ignition cycles in which the knock has taken place, i.e. the number of ignition cycles in which the knock is observed in successive 100 ignition cycles. Upon receipt of the signal from the knock detecting circuit 3, the ignition timing controller 4 advances or delays the ignition timing to optimize the latter. The detailed description of the knock detecting circuit 3 and the ignition timing controller 4 is not necessary because these circuit and controller are well known per se. It is to be understood here that the knock detecting apparatus of the invention can be combined with any type of device which can control the ignition timing upon detect of the occurrence of knocking.

Figure 2:
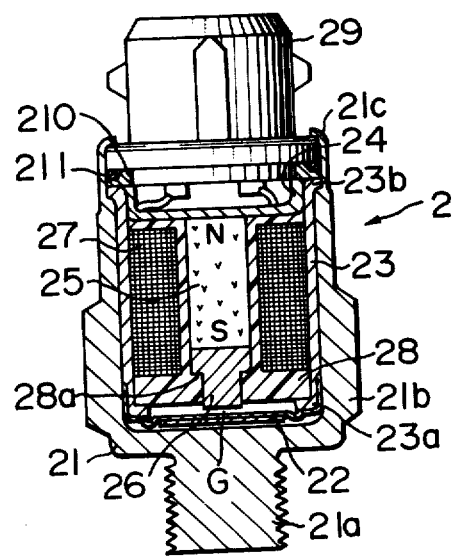
FIG. 2 is a vertical sectional view of a knock detecting apparatus of the first embodiment.

Knock detecting apparatus embodying the present invention will be described hereinunder. Referring to FIG. 2, a knock detecting apparatus 2 of the first embodiment has a main body, i.e. a substantially cup-shaped housing 21 provided with a threaded portion 21a adapted to be screwed into a threaded bore of the cylinder block of the engine and a hexagonal portion 21b adapted to be engaged by a tool for screwing and tightening the knock detecting apparatus. The housing is made of a material such as iron, brass or the like, and houses a vibration member 22 made of a magnetic material and having a resonance frequency ranging in the knock frequency of between 5 KHz and 10 KHz, a substantially tubular magnetic member 23 supporting at its lower end the vibration member 22, an upper magnetic member 24 disposed at the upper end of the tubular member 23, a magnet 25 extended in the tubular member 23 coaxially with the latter and adapted to produce a magnetic force, a central magnetic member 26 aligned with the magnet 25, and an electric winding or coil 27 wound around a coil bobbin 28 made of a synthetic resin.

As will be seen from FIGS. 3A and 3B, the vibration member 22 has a disc-shaped vibratory portion 22a, an annular frame portion 22b constituted by an annular recess around the vibratory portion 22a, a ring-shaped vertical wall 22c formed around the frame portion 22b and a damping vibratory portion 22d which will be mentioned later. The vibrating member 22 as a whole is made by a press work from a magnetic material such as iron, iron-nickel alloy, stainless steel or the like. In case where there is a possibility of rusting, the vibration member 22 is placed with nickel, zinc or the like material.

Referring again to FIG. 2, the tubular magnetic member 23 is provided at its lower end with a portion adapted to be forced into the vibration member 22 and at its upper end with a portion 23b adapted to be forced into the housing 21, and is made by a press work from a magnetic material such as iron, stainless steel or the like. After a forcible driving of the portion 23a in the vertical wall 22c of the vibration member 22, the tubular magnetic member 23 is forcibly and tightly driven into the housing 21 until it is located by the portion 23b. In this state, a small gap is left between the lower end of the frame portion 22b of the vibration member 22 and the inner bottom surface of the housing 21. The magnetic member 24 is also formed by a press work from a magnetic material. After mounting the coil 27, coil bobbin 28, magnet 25 and the central member 26 within the tubular magnetic member as illustrated, the upper magnetic member 24 is forcibly driven into the upper part of the upper tubular member 23 thereby to firmly fix the above-mentioned members in the upper tubular member 23. The central magnetic member 26 is supported by the step 28a formed at a lower portion of the central bore of the coil bobbin 28, so that the lower end surface thereof opposes to the vibration member 22 with a predetermined air gap G which is usually 0.1 to 0.7 mm. The central magnetic member 26, vibration member 22, tubular magnetic member 23 and the upper magnetic member 24 in combination form a closed magnetic circuit.

A connector 29 is secured to the upper open end of the housing 21 with a ring-shaped spacer 210 and a sealing "O" ring to seal the interior of the housing from the outside. This connector 29 provides an electric connection between the leads from the coil 27 and the external circuit. After placing the connector 29 at the predetermined position on the upper end of the housing, the upper end brim of the housing 21 is caulked over its entire periphery to rigidly fix the connector 29 in the housing 21. The knock detecting apparatus 2 having the construction heretofore described is firmly secured at its threaded portion 21a to the cylinder block of the engine.

In operation, since the knock detecting apparatus 2 is secured at its threaded portion 21a to the cylinder block, the vibration generated in the cylinder block due to the knocking is transmitted to the vibration member 22 through the housing 21. Since the vibration member 22 is fixed only at its outer peripheral portion 22c, the vibration member 22 vibrates in accordance with the frequency and strength of the transmitted vibration, while making a resonance vibration at its resonance frequency. Since the members 23, 24, 26, coil 27 and the magnet 25 are constructed rigidly to vibrate as a unit with the housing 21, only the vibratory member 22a vibrates in response to knocking, relatively to the magnetic path. In consequence, the air gap G between the vibratory portion 22a and the central member 26 is changed in response to the knocking.

The design is made such that a predetermined magnetic flux generated by the magnet 25 passes through the magnetic path constituted by the central magnetic member 26 and the vibration member 22. Therefore, the change in the air gap G appears as a change in the number of the magnetic flux in the magnetic path. Then, the coil 27 detects the change in the magnetic flux, i.e. the vibration caused by the knocking, as a voltage. The detected voltage is delivered to the knock detecting circuit 3 through the leads (not shown) passing through the connector 29.

Figure 3A:
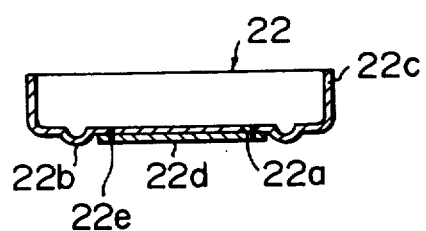
FIGS. 3A and 3B are a vertical sectional view and a bottom plan view, respectively, of a vibration member incorporated in the knock detecting apparatus as shown in FIG. 2.
Figure 3B:
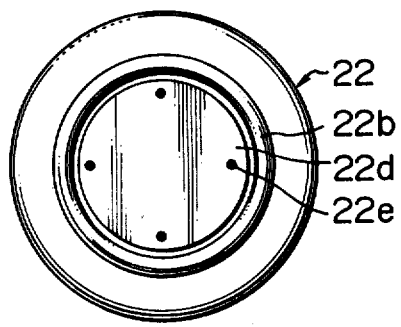

As will be clearly seen from FIGS. 3A and 3B, a vibration damping portion 22d is jointed to at least a portion of the vibratory portion 22a by, for example, a spot welding as at 22e. The vibration damping portion 22d contributes to the reduction of the degree of peak Q of resonance which will be mentioned later. Each material has a peculiar Q value, and it is difficult to obtain the desired Q value using existing material solely. The vibration member exhibits a delicate vibration particularly at a high frequency level of between 5 to 10 KHz, and it is quite difficult or almost impossible to control the vibration behaviour of the vibration member at such a high frequency. The detecting apparatus of the kind described is required to have a wide range of detection of knocking and a sufficiently high S/N ratio, and to quickly respond to the knocking without any time lag. The resonance type detector has a tendency that the attenuated vibration continues for a long time after the cease of the knock. This attenuation time is prolonged as the Q value of the resonance becomes higher. In the worst case, the attenuated vibration continues to the combustion stroke of the next cylinder in the firing order. This makes it difficult to discriminate the vibration caused by the knock from noise, i.e. from the ordinary engine vibration. This difficulty directly leads to an erroneous operation of the knock detecting apparatus particularly when the judgment as to the occurrence of knocking is made in terms of the ratio between the noise and the knock signal to improve the S/N ratio.

From the view point of the response characteristic, the Q value is preferably limited to a value below 50 dB in the case of ordinary 4 to 6 tandem cylinder engines. Namely, a Q value in excess of this upper limit level may cause a continuation of vibrations before complete attenuation to the combustion stroke of the next cylinder in the firing order, particularly when the engine is operating at a high speed.

It is also to be noted that there is a close relationship between the Q value and the detectable width of frequency range. In an extreme case, only a vibration at 8 KHz is detected when the resonance takes place at 8 KHz. As a matter of fact, however, there is no case where the Q value is infinite, so that there is a certain detectable frequency range around the resonance frequency. Ideally, the width of the detectable frequency range is spread as much as possible without incurring deterioration of the S/N ratio to an unacceptable level. The specification or demand for the Q value varies depending on the engine, and it is desirable to produce the detecting apparatus having optimum Q value complying with the demand. This in turn requires a flexible control of the Q value. As a matter of fact, the Q value of the vibration member is substantially determined and limited by the characteristic peculiar to the material. It is, therefore, quite difficult to create the resonance characteristic suitable for the operation characteristic of the engine. Particularly, the resonance characteristic at high frequency range of 5 to 10 KHz, which is essential requisite for the engine knock detecting apparatus, is close to the high-frequency operation limit of even the typical vibration body such as tuning fork or the like, and is too delicate to produce. In addition, it is absolutely difficult to stably and easily control the Q value which is, as stated before, determined substantially by the characteristic peculiar to the material used.

In this connection, it is remarkable and quite advantageous that, in accordance with the invention, the Q value of the vibration member is controlled and lowered to a moderate level by the mutual mechanical control between the disc-shaped vibratory portion 22a and the vibration damping portion 22d as will be understood from FIGS. 3A and 3B.

In the embodiment shown in FIG. 2, the double-layered structure is applied only to a portion of the vibratory portion 22a of the vibration member 22. For facilitating the fabrication, however, it is possible to adopt the double-layered structure in the whole part of the vibration member 22.

Figure 4:
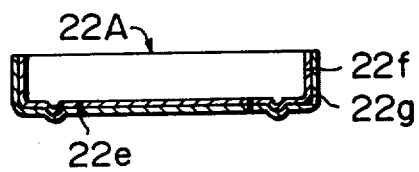
FIGS. 4 and 5 are vertical sectional views of vibration members incorporated in the second and third embodiments of the invention, respectively.

FIG. 4 shows a second embodiment in which a vibration member 22A is formed by a simultaneous press work of two discs 22f, 22g of a magnetic material. These discs 22f and 22g are rigidly secured to each other by spot welding as at junctures 22e. In the first and second embodiment described heretofore, the two vibratory parts are designed to make mutual contact over their entire areas. It is, however, difficult to obtain a uniform mutual contact over their entire surfaces. Namely, the Q value may be undesirably fluctuated due to variation in the contacting area and contacting pressure.

Figure 5:
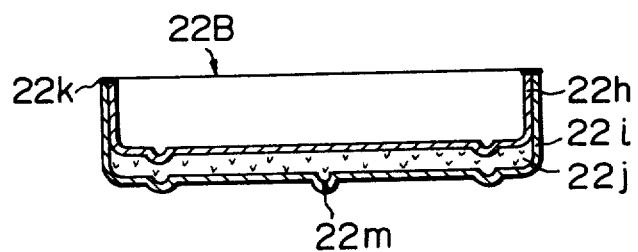

This problem is overcome by a third embodiment of the invention in which, as shown in FIG. 5, a closed space is formed between two opposing discs 22h, 22i and is filled with a damping material 22j such as an oil. The filling and sealing of the oil is made, for example, by effecting a welding over the entire circumference of the end 22k of the fitting portion, filling the space with the oil and then effecting a welding on the oil filling port 22m to close the latter. It will be understood that the confined oil or the like damping material affords a contact over the entire area of the two discs and uniform distribution of the contacting pressure. It is also to be noted that the damping effect can be adjusted by changing the viscosity of the damping material, which in turn permits a control of the Q value advantageously.

It is not essential that the damping material is a liquid such as oil, but other material such as solid powders of aluminum, ferrite or the like and resin can equally be used as the damping material filling the space between two discs. Note, however, that different damping material provides different waveforms of damping characteristic. For instance, magnetic powders provides a substantially linear attenuation waveform, while other damping materials provide ordinary free damping waveforms.

Figure 6:
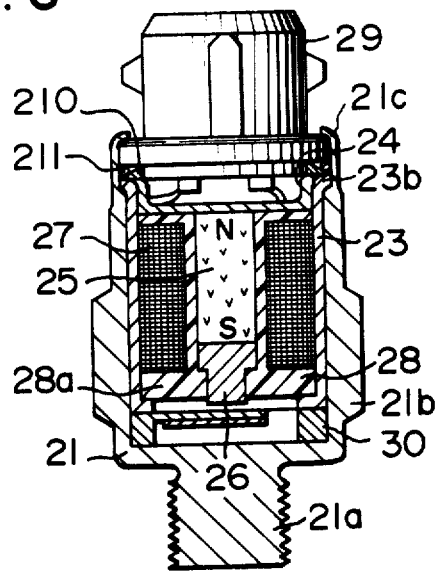
FIG. 6 is a vertical sectional view of a knock detecting apparatus constructed in accordance with a fourth embodiment of the invention.
Figure 7A:
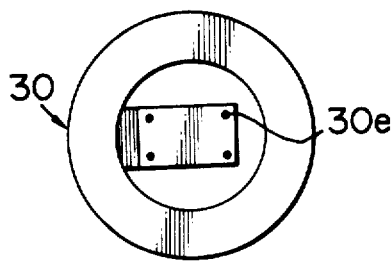
FIGS. 7A and 7B are a plan view and a vertical sectional view of a vibration member incorporated in the knock detecting apparatus as shown in FIG. 6.
Figure 7B:
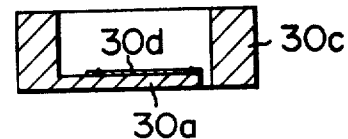

In the first to third embodiments described heretofore, the vibration member has a substantially disc-like form. This, however, is not exclusive and the knock detecting apparatus of the invention can have a cantilevered vibration member. A knock detecting apparatus having a cantilevered vibration member 30 will be described hereinunder as a fourth embodiment with reference to FIGS. 6 and 7A, 7B. In these Figures, the same reference numerals are used to denote the same or equivalent parts to those in FIG. 1. The major point of difference is that the vibration member 30 has a fitting or fixing portion 30c having a large wall thickness as compared with the vibratory portion 30a as shown in FIGS. 7A and 7B so that the vibratory portion 30 is substantially cantilevered. As in the case of the preceding embodiments, the vibration damping portion 30d is jointed to the vibratory portion by spot welding or the like at junctures 30e.

Figure 8A:
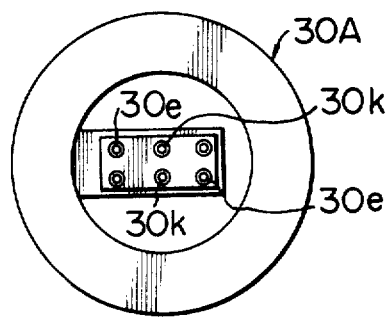
FIGS. 8A and 8B are a plan view and a vertical sectional view, respectively, of a vibration member incorporated in a knock detecting apparatus constructed in accordance with a fifth embodiment of the invention.
Figure 8B:
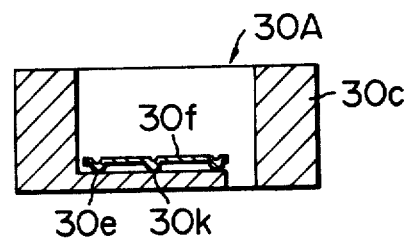

FIGS. 8A and 8B show a fifth embodiment in which, contrary to the fourth embodiment shown in FIG. 4, wherein the vibration damping portion 30d makes contact over the entire area of the vibratory portion 30a, a vibration damping portion 30f is adapted to make local contact with the vibratory portion 30a. More specifically, among 6 (six) portions of contact shown in FIGS. 8A and 8B, four points 30e are the points of spot welding while the remainder two points are points 30K of movable contact.

Figure 9:
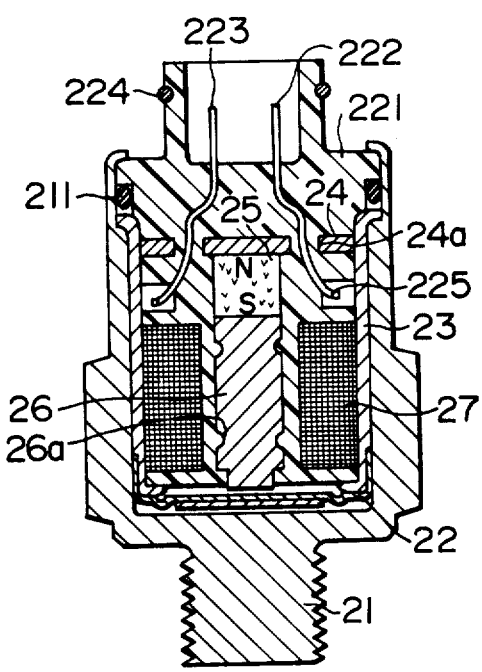
FIG. 9 is a vertical sectional view of a knock detecting apparatus constructed in accordance with a sixth embodiment of the invention suitable for a mass production.

FIG. 9 shows a sixth embodiment, which is a modification of the detecting apparatus of the first embodiment suitable mass production. This sixth embodiment can incorporate any of the vibration members 22 of the construction as shown in FIGS. 3, 4 and 7. In FIG. 9, the same reference numerals are used to denote the same or equivalent parts to the first embodiment. The major point of modification resides in that the coil bobbin 28 and the connector 29 are shaped as an integral body 221 from a synthetic resin, and that the parts such as leads 222, 223, central magnetic member 26, upper magnetic member 24 having a passage bore for the leads 222, 223 and the magnet 25 are accommodated in the space defined in the integral body 221. The upper magnetic member 24 is forcibly fitted at its outer periphery to the inner periphery of the tubular magnetic member to fix the integral body 221. Output terminals 225 of the coil 27 are fixed to the leads 222, 223 by soldering or caulking. A reference numeral 224 designates a sealing "O" ring. The central magnetic member 26 is provided in its outer peripheral surface with a ring-shaped recess 26a which ensures a higher tightness of contact between the central magnetic member 26 and the integral body 221. As in the case of the first embodiment, an "O" ring 211 is used to seal the vibration member 22 from the ambient air.

Figure 10:
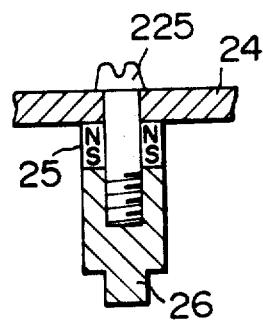
FIG. 10 is a vertical sectional view of a modification of an essential part of the apparatus shown in FIG. 9.

Furthermore, in the embodiment shown in FIG. 9, the upper magnetic member 24, central magnetic member 26 and the magnet 25 are firmly secured to the integral body 221 by the molding material of the latter, so that they can sufficiently endure the vibration during normal operation of the engine. In the case where the vehicle mounting the engine is required to sustain a severe operating condition, it is advisable to obtain a higher strength by forming central bores in the upper magnetic member 24, magnet 25 and the central magnetic member 26 and to fix these members to one another by a bolt 225 or by means of a caulking as illustrated in FIG. 10, before the moulding of the integral body 221. The bolt 225 is preferably made of a non-magnetic material but a magnetic material can be used also although the level of the magnetic force may be lowered. This construction affords an easier assembling, and hence, a lower cost of production.

In the embodiments described hereinbefore, vibration-electric transducers making use of electromagnetic induction are used as the means for detecting the vibration. The invention, however, is applicable to an apparatus which acts in accordance with piezoelectric principle of operation.

Figure 11:
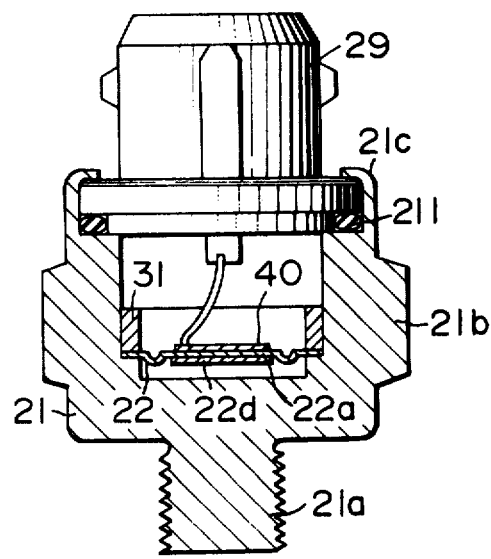
FIG. 11 is a vertical sectional view of a knock detecting apparatus constructed in accordance with a seventh embodiment of the invention relying upon a piezoelectric type operation principle.

FIG. 11 shows a seventh embodiment of the invention making use of a piezoelectric type operation. The major point of difference resides in that a piezoelectric element 40 is locally fixed to one side of a disc-shaped vibration member 22 of a conductive material, by means of a conductive adhesive or spattering. The disc-shaped vibration member 22 may be made of an insulating plate of ceramics, resins or the like plated with a conductive film. The metallic vibration member 22 is forcibly fitted and fixed in the housing 21 by means of a ring-shaped spacer 31. The surface at which the piezoelectric element 40 is fixed to the vibratory portion 22a is grounded through the spacer 31 and the housing 21. A thin electrode film (not shown) is bonded to the other side of the piezoelectric element 40, and is connected to the terminal in the connector 29 by means of leads. According to this embodiment, the vibration is directly converted into electric output by the piezoelectric element 40.

In the embodiments of the invention described hereinbefore, the multi-layered structure is adopted in at least a part of the vibratory portion, in the form of a double-layered structure. This, however, is not exclusive and it is possible to adopt a multi-layered structure having three or more layers to a part or whole of the vibratory portion.

Hitherto, it has been quite difficult to control or adjust the Q value of vibration member because the Q value is determined substantially by the nature of the material of the vibration member, which in turn imposes a difficulty in the production of the knock detecting apparatus having desirable detecting performance. According to the invention, however, it is possible to control and adjust the Q value by adopting a multi-layered structure for the vibratory portion of the vibration member, to make it possible to optimize the Q value and, hence, the width of detection of the knock frequency to realize the ideal trapezoidal form of the detection characteristic. In the knock detecting of the invention, the stability of detection against the shift of resonance is increased as compared with the conventional detecting apparatus having a simple symmetric resonance system. Namely, in the conventional apparatus, it is not possible to cover the wide range of change of knock frequency attributable to the change in the state of combustion in the engine, because of the too high level of the Q value. In contrast, in the knock detecting apparatus of the invention, it is possible to cover the wide range of detection of knock frequency and to optimize the Q value. In consequence, the attenuation time which imposes a problem in the detection apparatus having a high Q value can be selected optimumly in accordance with the condition of the engine, so that the trouble concerning the difficulty in the discrimination of the vibration caused by the knock from the ordinary vibration noise, attributable to a drag of the attenuated vibration, is avoided to ensure a high response characteristic of the detecting apparatus.

The knock detecting apparatus of the invention has superior characteristics in all aspects of performance, construction, durability and so forth, as will be understood from the foregoing description, and can suitably be used as the detecting apparatus incorporated in the ignition timing control system in which the ignition timing is controlled through a feedback of the knock taking place in the engine.

What is claimed is:

1. A knock detecting apparatus for an internal combustion engine comprising:
   a main body fixed to said engine and adapted to be vibrated as a unit with said engine;
   a vibration member supported by said main body and provided with a vibratory portion which has a resonance frequency in the range of frequency of knock of said engine, at least a part of said vibratory portion having a multi-layered structure consisting of two or more layers to adjust and optimize the degree of peak of resonance of said vibratory portion; and
   means disposed in the vicinity of said vibratory portion and adapted for detecting the vibration of said vibratory portion.

2. A knock detecting apparatus as claimed in claim 1, wherein said vibrating member is made of at least two disc-shaped members which are press-worked simultaneously.

3. A knock detecting apparatus as claimed in claim 1, wherein said vibrating member has a disc-like form and is fixed at its periphery to said main body.

4. A knock detecting apparatus as claimed in claim 1, wherein said vibratory portion of said vibrating member has a rectangular form and is fixed only at its one end to said main body.

5. A knock detecting apparatus as claimed in any one of claims 1 to 4, wherein a vibration damping material is charged in the portion of said multi-layered structure of said vibration member.

6. A knock detecting apparatus as claimed in claim 5, wherein said vibration damping material is an oil.

7. A knock detecting apparatus as claimed in claim 5, wherein said vibration damping material is a resin or the like damping material.

8. A knock detecting apparatus as claimed in claim 5, wherein said vibration damping material is powders.

9. A knock detecting apparatus for an internal combustion engine comprising:
   a tubular housing having opposite open end and closed end, said closed end being provided with a threaded portion adapted to be secured to an internal combustion engine;
   a permanent magnet disposed substantially concentric within said tubular housing;
   a first magnetic member disposed within said housing and adjacent to the closed end of the tubular housing in alignment with said permanent magnet;
   a second tubular magnetic member disposed within said tubular housing and extending along an inner wall of said tubular housing,
   a third magnetic member disposed within said tubular housing adjacent to the open end thereof, said third magnetic member extending between an end of said second magnetic member and an end of said permanent magnet;
   a fourth magnetic member having a peripheral portion and a central portion disposed between the first magnetic member and the closed end of the tubular housing so that the central portion is spaced apart from the first magnetic member and from the closed end to remain air gaps therebetween, while said peripheral portion being rigidly secured to the tubular housing and the opposite end of the second magnetic member, said central portion of said fourth magnetic member comprising multiple layered plates;
   an electric winding wound around said first magnetic member to generate electric output signals in response to changes in magnetic flux passing through a magnetic circuit formed by said permanent magnet, first magnetic member, second magnetic member, third magnetic member, fourth magnetic member and said air gap between the first and fourth magnetic members;
   means rigidly securing said permanent magnet, said first, second and third magnetic members and said electric winding to said tubular housing; and
   a cover rigidly secured to said tubular housing at the open end thereof to seal the interior of the tubular housing from the ambient atmosphere.

10. A knock detecting apparatus as claimed in claim 9, wherein said fourth magnetic member comprises a first and second metal plate attached to each other.

11. A knock detecting apparatus as claimed in claim 9, wherein said fourth magnetic member comprises;
   a first and second metal plates attached to each other at the periphery thereof and forming a sealed space therebetween and
   a damping material charged in said sealed space.

* * * * *